May 5, 1964

M. B. RHYNE 3,131,622

AUTOMATIC COOKER

Filed Dec. 13, 1960

Marjorie B. Rhyne
INVENTOR.

BY *Clarence A. O'Brien*
and *Harvey B. Jacobson*
Attorneys

May 5, 1964   M. B. RHYNE   3,131,622
AUTOMATIC COOKER
Filed Dec. 13, 1960   2 Sheets-Sheet 2

Marjorie B. Rhyne
INVENTOR.

United States Patent Office 3,131,622
Patented May 5, 1964

3,131,622
AUTOMATIC COOKER
Marjorie B. Rhyne, Rte. 1, Dallas, N.C., assignor of one-half to W. Judson Rhyne, Dallas, N.C.
Filed Dec. 13, 1960, Ser. No. 75,510
7 Claims. (Cl. 99—330)

This invention relates to cooking apparatus of the steaming type having an automatic control system for controlling the admission of water thereto and the heating thereof.

A primary object of the present invention is to provide a cooking apparatus which is automatically operative, capable of being efficiently installed and safe to operate and use.

Another object of this invention is to provide a steam cooking device which may be set for cooking for a preselected period of time during which time cooking will be performed in a controlled and safe manner.

An additional object of this invention is to provide a steam cooking device having a timer control for preselecting the period of time during which cooking is to occur, which apparatus is otherwise completely automatic including the supply of water thereto and maintaining of the water therein at the proper predetermined level.

The cooking apparatus of the present invention may be conveniently installed below a table top which may also have mounted therewithin the timer mechanism. The cooking device itself involves an insulated receptacle disposed below the table top within which a cooking vessel is received. The cooking vessel is of conductive material and includes a water chamber within a lower portion thereof and an upper portion which receives a plurality of removable steaming trays or compartments within which the food to be cooked is retained so that the steam or vapor generated from its source or water disposed therebelow will pass upwardly through the compartments for cooking the food. The insulating receptacle accordingly has mounted therewithin at the bottom thereof an electrical heating coil. Also a water supply conduit is connected to the receptacle above the cooking vessel for supply of water thereto. An electrical power circuit providing high voltgae and current is connected through the timer device and a thermostat control to the electrical heating coil for the cooker and also to a solenoid operated valve which when energized will open the water supply conduit for supply of water to the cooking vessel. The simultaneous supply of water and energy to the heating coil will be accordingly cut off after the switch within the timer disconnects the power supply therefrom after an elapse of a pre-selected period of time. Also, the thermostat control will shut off the power supply when the temperature of the cooking vessel reflecting the level of energy transferred thereto by the heater, exceeds a predetermined value preferably that value at which the water therewithin will boil under the prevailing conditions. In order to control and maintain a safe level of water within the cooking vessel, a water level probe device is mounted within the cover for the receptacle and projects downwardly therefrom. The probe device is connected to a low voltage circuit for energizing a second solenoid control valve in the water supply conduit so that when the water reaches a predetermined level or the volume occupied by the vapor is reduced to a minimum, contact with the probe will establish a circuit through the water and conductors connected to the cooking vessel and to the probe, supplied from a low voltage source for energizing the solenoid control valve which will cut off the water supply. The low voltage source is conveniently obtained from a step down transformer operatively connected to the power supply for the cooker heating coil and the other water supply control valve. As a result of the above noted arrangement, a completely automatic and safe cooking apparatus is realized.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
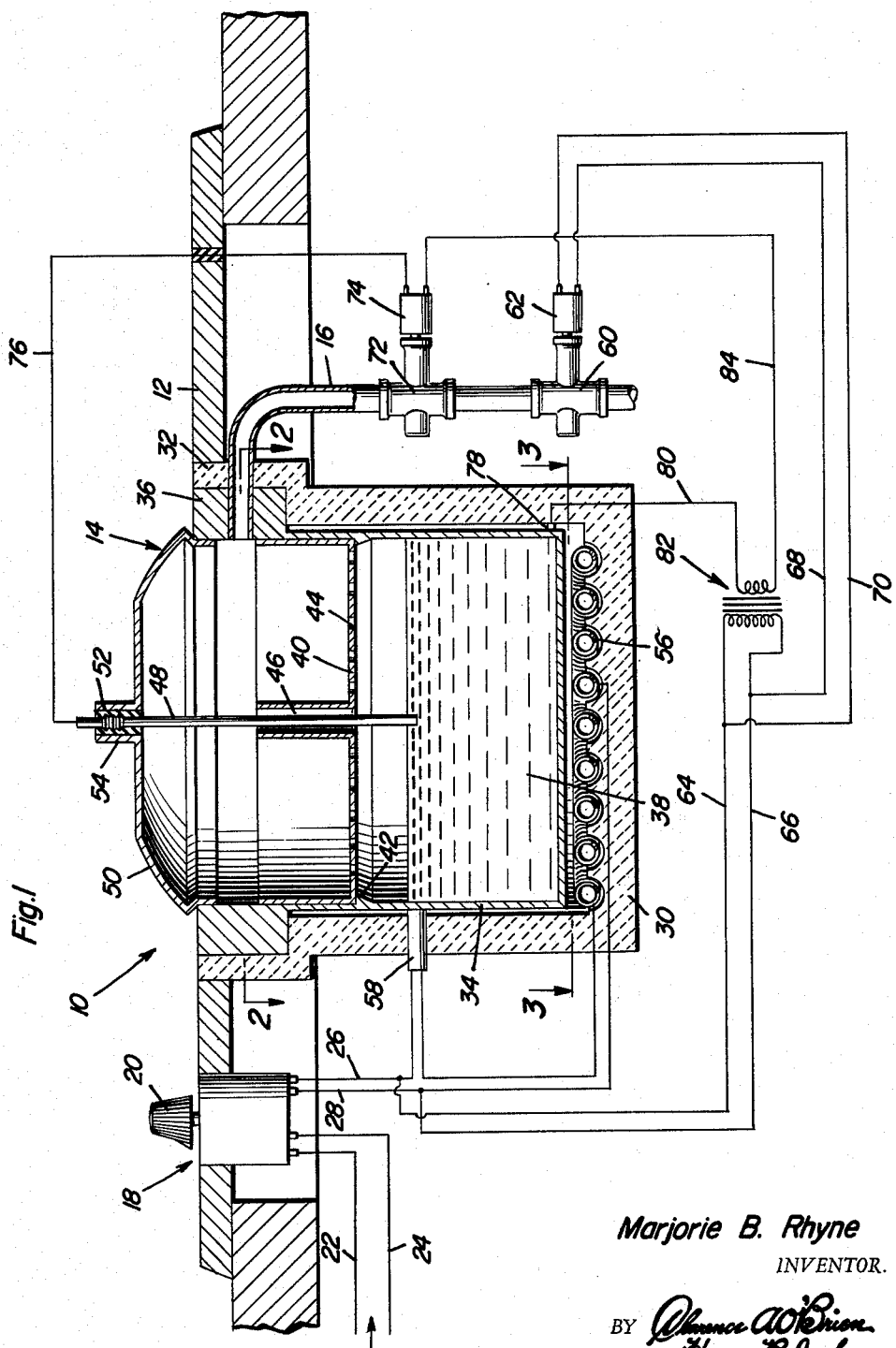
FIGURE 1 is a sectional view of the cooking apparatus of this invention with the electrical power and control circuits being diagrammatically illustrated.

Referring now to the drawings in detail, it will be observed that the cooking apparatus generally referred to by reference numeral 10 in FIGURE 1 is mounted mostly below a table top 12 providing a convenient and safe installation for the apparatus 10. The apparatus 10 includes the cooking mechanism generally referred to by reference numeral 14 to which a water supply conduit 16 is connected which may be connected to the usual household water supply main. Mounted within the table top 12 on the side of the cooking mechanism 14 opposite the water supply conduit 16, is a timer device 18 which may be of any suitable design including switching mechanism which when set by the timer dial 20 will disconnect the power line conductors 22 and 24 disposed below the table top, from the power supply conductors 26 and 28, after a pre-selected period of time has elapsed.

Figure 2:
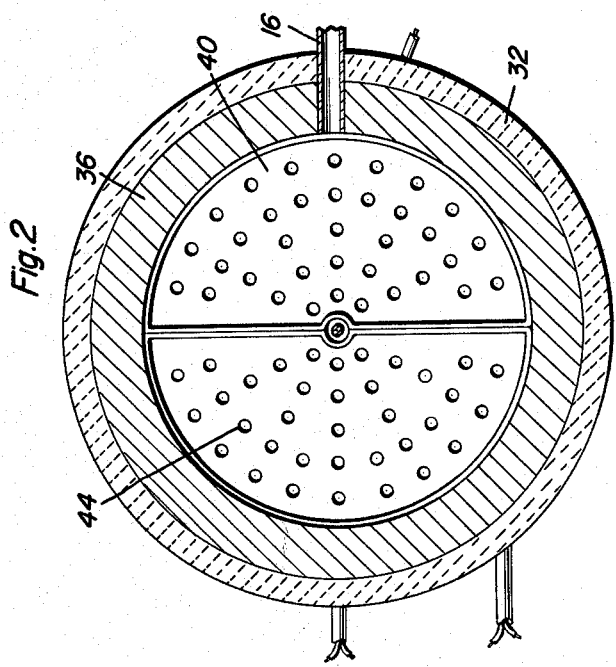
FIGURE 2 is a sectional view taken through a plane indicated by section line 2—2 in FIGURE 1.

Referring now to the cooking mechanism 14 itself, it will be observed that the cooking mechanism includes a receptacle member 30 which depends below the table top 12 and is connected thereto at the upper end of an enlarged portion 32. As seen from FIGURES 2 and 3, the receptacle 30 is cylindrical in form although the actual cross-sectional shape may be varied as desired. The material of which the receptacle 30 is made will necessarily be of an insulating material such as a ceramic in order to reduce heat transfer therefrom and also provide an electrically non-conductive mounting for various parts of the apparatus as will be hereafter explained. Received within the receptacle 30 and seated within the shoulder formed by the enlarged portion 32 thereof is a cooking vessel or container 34 of similar cross-sectional shape as that of the receptacle 30. The cooking vessel 34 includes an upper portion 36 through which the water supply conduit 16 extends for supply of water thereto. It will be observed that the water 38 is disposed within the lower portion of the vessel 34 while the upper portion thereof has a plurality of trays or compartments 40 within which the food to be cooked is retained. The compartments are removable and are seated on an annular ledge 42 projecting inwardly from the inner wall of the vessel 34 for such purpose. The compartments 40 accordingly include a plurality of apertures 44 through which steam generated from the water 38 below may pass for cooking the food within the compartments. Although two such compartments 40 are illustrated in FIGURES 1 and 2, it should be understood that any number of such compartments may be utilized as desired. It will however be observed that the compartments 40 are so shaped as to provide a central passage 46 therebetween.

As seen in FIGURE 1, the central passage 46 formed between the compartments 40 accommodates a probe element 48 which is connected to a cover member 50 which is seated within the upper portion 36 of the vessel 34. Accordingly, the cover 50 not only retains the steam within the cooking mechanism 14 but also provides a mounting for the water level probe element 48. The probe element 48, is therefore threadedly received within an insulated sleeve 52 disposed within an upwardly projecting portion 54 of the cover 50. The water level may therefore be controlled when the water 38 within the vessel 34 contacts the bottom of the probe element 48 as will be hereafter explained.

Figure 3:
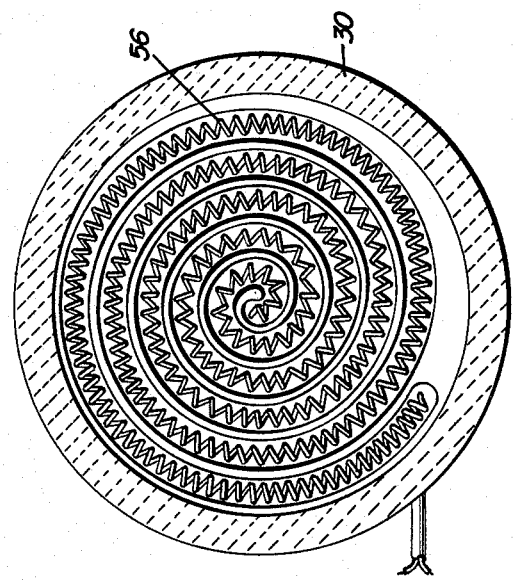
FIGURE 3 is a sectional view taken through a plane indicated by section line 3—3 of FIGURE 1.

As seen from FIGURES 1 and 3, an electrical heating coil 56 is disposed within the bottom portion of the receptacle 30 for the purpose of heating the cooking vessel 34 disposed thereabove. Accordingly, the heating coil terminals are connected to the power supply conductors 26 and 28. When the timer 18 is set therefore, the power supply through lines 22 and 24 will be connected to the heating coil 56 for a predetermined length of time. However, in order to avoid overheating of the vessel 34 above the temperature necessary to cause the water 38 therewithin to boil, a thermostat control switch mechanism 58 is mounted within the side of the receptacle 30 in contact with the cooking vessel 34, the thermostat switch device 58 being connected in series in the conductor line 26. Accordingly, the heating coil 56 will be disconnected from the power supply regardless of the time elapse when the temperature of the vessel 34 increases beyond a predetermined value.

The water supply to the cooking vessel 34 through the conduit 16 is controlled by a main control valve mechanism 60. The valve mechanism 60 is normally biased to a closed position cutting off the water supply to conduit 16. When however the solenoid actuator 62 which is connected to the valve mechanism 60 is energized, the valve mechanism 60 is opened to admit water for supply by the conduit 16 to the cooking vessel 34. Accordingly, when the timer mechanism 18 is set the power supply therethrough is connected in parallel by means of the conductors 64 and 66 and conductors 68 and 70 to the solenoid actuator 62 to cause energization thereof to open the valve mechanism 60. Water will therefore be admitted to the cooking vessel 34 simultaneously with the heating of the heating coil 56 by means of the high voltage power supply. It will also be observed that the valve mechanism 60 will be retained open under control of the timer mechanism 18 only. The thermostat control device 58 controls only the heater coil 56 inasmuch as it is desirable to maintain the water supply available in the event the temperature of the cooking vessel 34 rises to a dangerous value.

It will however be apparent that the level of the water 38 within the cooking vessel 34 must be controlled so as to avoid overflow. Accordingly, a second control valve mechanism 72 is provided in the supply conduit 16 which valve mechanism 72 is actuated from a normally open position to a closed position upon energization of the solenoid actuator 74. Energization of the solenoid actuator 74 is therefore controlled through the probe element 48 which is connected by conductor 76 to the solenoid actuator 74. Inasmuch as the water 38 will contain salt therewithin, current will be conducted therethrough from the end of the probe element 48 to a contact element 78 mounted by the receptacle wall of the receptacle 30 in contact with the lower portion of the outer surface of the cooking vessel 34 which is conductive. A conductor 80 is connected to the contact element 78. It will be appreciated therefore that inasmuch as the control circuit for the solenoid actuator 74 will involve the passage of current through the vessel 34 itself, a low safer voltage is utilized for such purpose. Accordingly, a step down transformer device 82 constitutes the low voltage source to which the conductor 80 and a conductor 84 are connected. The other terminal of the conductor 84 is connected to the solenoid actuator 74 so that when the water contacts the probe element 48 a circuit will be closed causing energization of the solenoid actuator 74 and closing of the valve mechanism 72 to cut off the supply of water to the vessel 34. The primary coil of the step down transformer 82 is therefore connected to the high voltage conductors 64 and 66 while the secondary output coil is connected to the conductors 80 and 84 of the low voltage circuit.

From the foregoing description, operation and utility of the cooking apparatus and the control system therefor will be apparent. Summarizing, however, the operation, it will be apparent that one need only place the food within the compartments 40 of the cooking mechanism 14 and place the cover 50 thereon. The timer mechanism 18 will then be set for a pre-selected period of time so that the power supply will be connected to the heating coil 56 through the thermostat control device 58 and to the solenoid actuator for the valve mechanism 60 to open the valve mechanism 60 and admit water from the household supply main to the cooking vessel 34. The water will therefore be heated until it begins to boil and the steam passes upwardly through the apertures 44 in the compartments 40 to cook the food therewithin. When the temperature of the cooking vessel 34 reaches a predetermined value sufficient to maintain the water 38 boiling, the device 58 will disconnect the power supply thereto. In the meantime water will be continuously supplied to the vessel 34 through the conduit 16 past the open valve 60. However, should the water reach a predetermined level contact will be made with the probe element 48 closing a circuit therethrough so that the low voltage source from the step down transformer device 82 will cause energization of the solenoid actuator 74 to close the valve mechanism 72 cutting off the water supply to the cooking vessel 34. When the water level drops below the predetermined level as determined by the bottom of the probe element 48, the valve mechanism 72 will open and again cause water to be admitted into the cooking vessel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Automatic cooking apparatus comprising, insulating receptacle means, high voltage heating means mounted in said receptacle means, conductive container means received within said receptacle in heat transfer relation to said heating means and containing an electrically conductive liquid therewithin, liquid supply means operatively connected to said container means for supply of said liquid thereto simultaneously with energization of said high voltage heating means for a predetermined period of time, removable closure means seated on the receptacle means in non-conductive relation to the container means to define an evaporation chamber for the liquid within the container means and low voltage cut-off means operatively connected to the liquid supply means, the closure means and the container means for interrupting the supply of said liquid to the container means when the closure means is seated and the liquid attains a level establishing an electrically conductive path between the container means and the closure means.

2. The combination of claim 1, including timer means operatively connected to the high voltage heating means, the liquid supply means and the low voltage cut-off means for simultaneous deenergization thereof to predetermine said period of time.

3. The combination of claim 1, including temperature responsive means operatively connected to the heating means and in contact with the container means for deenergizing the heating means above a predetermined temperature of the container means above the boiling temperature of the liquid during the supply thereof, to regulate the rate of heat transfer between the container and the liquid.

4. In combination with a thermally and electrically conductive container provided with a heater and a removable lid to enclose and selectively vent a chamber containing liquid and vapor produced therefrom by conduction of heat to the container; insulating means for mounting the container and lid to establish a heat transfer barrier for the liquid in the container, means for simultaneously supplying liquid and heat energy to the container and the heater, respectively, during a predetermined period, means directly responsive to an elevated temperature of the container above the boiling temperature of the liquid to instantaneously interrupt supply of energy to the heater during said predetermined period, in order to limit the rate of supply of heat energy to the container and liquid therein, level sensing means responsive to a rise of liquid in said container to a predetermined level for interrupting said supply of liquid during said predetermined period and means mounting said level sensing means on the lid operative upon removal of the lid to open the chamber and disabling said level sensing means.

5. Apparatus for the generation of vapor from a liquid for cooking vapor absorbing foods that comprises, a thermally and electrically conductive chamber, manual means for selectively opening and closing said chamber to atmosphere, means for supporting such foods in said chamber spaced from the bottom above the level of water therein, an inlet valve when open introducing water at the top of said chamber for passage through the foods and the vapor, means mounted outside of the chamber in heat transfer relation thereto and below said level of water for heating such water to active boiling, a cut-off valve rendered operative to temporarily interrupt supply of such water, means responsive to a selected level of the water for rendering said cut-off valve operative while the inlet valve is open and the heating means is energized to increase the quantity of vapor and reduce the quantity of water to maintain said selected level, timer means for simultaneously deenergizing said heating means and closing the inlet valve after a selected period of time, means responsive to the temperature of the chamber above the boiling temperature of the water for temporarily deenergizing the heating means during supply of such water by the inlet valve to limit the rate of heat transfer to the water from the chamber, and mounting means for said level responsive means and operative upon opening of said chamber to atmosphere by the selective opening and closing means for disabling operation of the cut-off valve.

6. The combination of claim 5 wherein said level responsive means includes an electrode extending through said food supporting means within the chamber for establishing an electrically conductive path through such water and the chamber for energizing the cut-off valve, said mounting means comprising an insulative mounting element on the selective opening and closing means for threadedly mounting said electrode.

7. Apparatus for producing an enclosed vapor atmosphere for cooking purposes or the like comprising, conductive chamber means defining an enclosed space containing a variable volume of vapor, a source of vapor disposed within said enclosed space, means for quantitively increasing said source of vapor to maintain a predetermined level thereof in the chamber means, means for generating vapor from said source simultaneously with said quantitive increase thereof to vary the volume of vapor, sensing means responsive to a reduction in said volume of vapor in the enclosed space below a predetermined minimum to interrupt operation of said vapor source, increasing means to thereby establish a rapid increase in the volume of vapor in said enclosed space to restore the level of said source of vapor, means operative in accordance with the level of energy transferred to the chamber means by the vapor generating means to interrupt operation of the vapor generating means for limiting said level of energy and the rate of increase in the volume of vapor generated so as to regulate the volume of vapor in said enclosed space, manual means for selectively venting said enclosed space, and means operatively mounting the sensing means and operative in response to venting of said enclosed space for disabling said sensing means.

References Cited in the file of this patent
UNITED STATES PATENTS

| | | |
|---|---|---|
| 1,976,219 | Fletcher et al. | Oct. 9, 1934 |
| 2,588,908 | Crane | Mar. 11, 1952 |
| 2,623,449 | Losee | Dec. 30, 1952 |
| 2,624,266 | Colburn et al. | Jan. 6, 1953 |
| 2,660,948 | Forschner | Dec. 1, 1953 |
| 2,734,826 | Stentz et al. | Feb. 14, 1956 |
| 2,766,366 | Eckhoff | Oct. 9, 1956 |
| 2,813,161 | Tuttle | Nov. 12, 1957 |
| 2,813,965 | Arnett | Nov. 19, 1957 |
| 2,817,299 | Weis | Dec. 24, 1957 |